A. SANCHEZ & C. BARADAT.
ROTARY INTERNAL COMBUSTION ENGINE.
APPLICATION FILED OCT. 29, 1912.
1,095,034.
Patented Apr. 28, 1914.
3 SHEETS—SHEET 1.
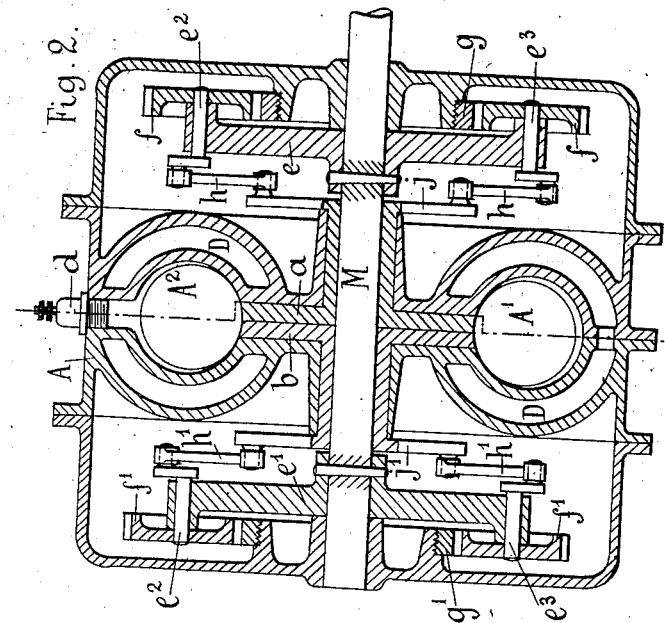
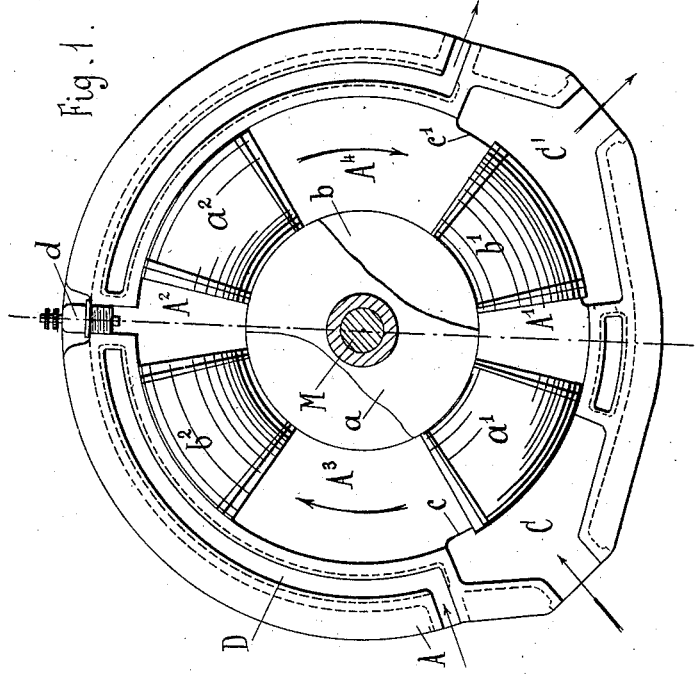
Witnesses
Inventors
Antonio Sanchez
and Claudio Baradat

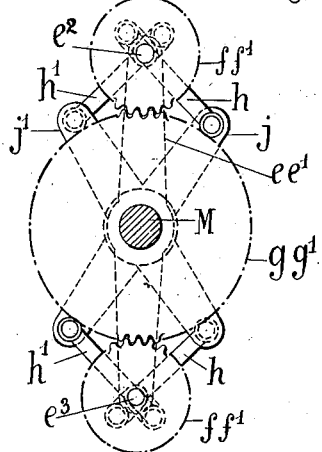
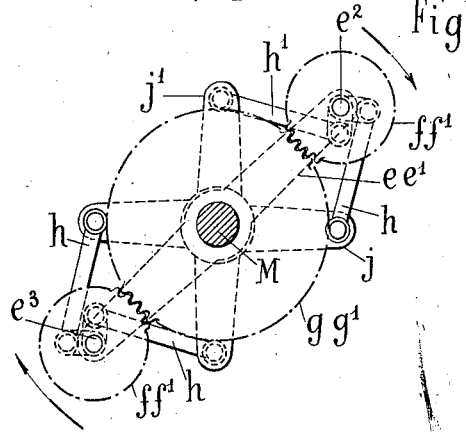
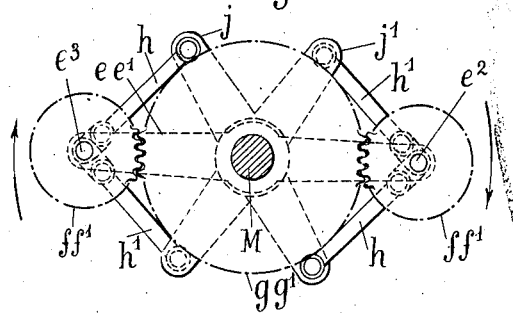

A. SANCHEZ & C. BARADAT.
ROTARY INTERNAL COMBUSTION ENGINE.
APPLICATION FILED OCT. 29, 1912.
1,095,034.
Patented Apr. 28, 1914.
3 SHEETS—SHEET 3.
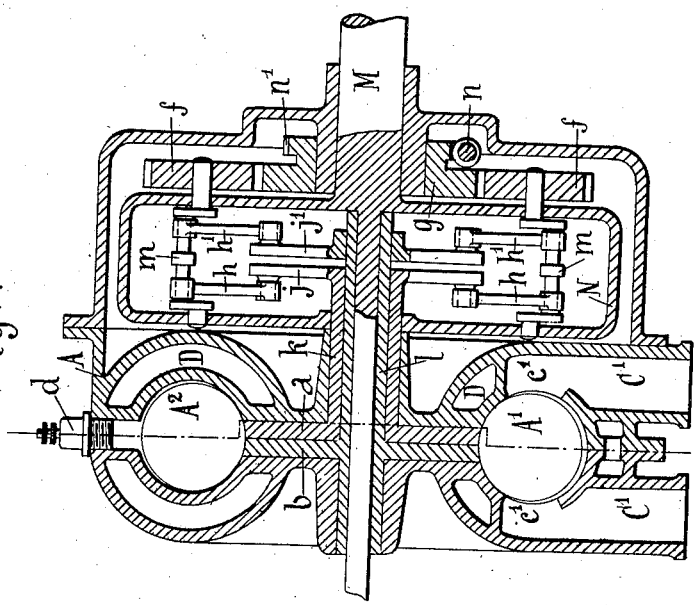
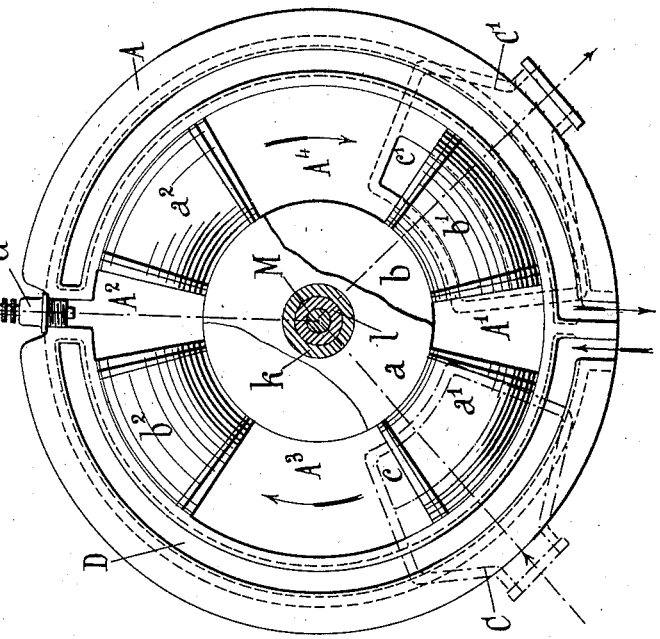
Witnesses
Inventors
Antonio Sanchez
and Claudio Baradat

UNITED STATES PATENT OFFICE.

ANTONIO SANCHEZ AND CLAUDIO BARADAT, OF PARIS, FRANCE.

ROTARY INTERNAL-COMBUSTION ENGINE.

1,095,034. Specification of Letters Patent. Patented Apr. 28, 1914.

Application filed October 29, 1912. Serial No. 728,524.

*To all whom it may concern:*

Be it known that we, ANTONIO SANCHEZ, merchant, a subject of His Majesty the King of Spain, and resident of No. 64 Rue Pierre Charron, Paris, France, and CLAUDIO BARADAT, engineer, a subject of His Majesty the King of Spain, and resident of No. 10 Rue de Ponthieu, Paris, France, have invented new and useful Improvements in Rotary Internal-Combustion Engines, of which the following is a specification.

This invention relates to that class of rotary engines involving the use of a plurality of pistons operating in an annular cylinder in such a manner that the spaces comprised between two consecutive pistons increase and decrease twice for every revolution, in order to produce the four phases of the Otto cycle.

The inlet and the exhaust take place automatically without the assistance of any valve, by means of the pistons themselves which, in uncovering and covering, during their passage, ports formed in the wall of the cylinder, cause a communication to be established, at times, between the spaces formed between the said pistons and the suction and exhaust chambers.

The rotary engine built according to the present invention belongs to the class above referred to.

One of its main characteristics resides in that the pistons are capable of approaching and receding from each other without either one interrupting its continuous rotary motion.

Another main characteristic resides in the employment of an epicycloidal gear for producing the approaching and receding motion of the pistons relatively to each other.

Another characteristic lies in the provision of means whereby the epicycloidal gear is capable of being adjusted in order to enable the timing of the engine to be varied.

The engine herein described may, like all other engines, be operated by means of lighting gas, water-gas or gasolene and may be used in the case of stationary engines or engines for automobiles and aviation and, in a general way, in all cases where it is desired to take advantage of the Otto cycle.

The following description applies, as an instance, to an engine particularly intended for automobilism and aviation.

Figures 1 and 2 are vertical sections taken at right angles to each other. Figs. 3, 4 and 5 show the epicycloidal gear in different positions. Figs. 6 and 7 are vertical sections showing a modification of the construction illustrated in Figs. 1 and 2.

Referring to Figs. 1 and 2, A is a casing provided with an annular cavity or cylinder, the cross section of which may be circular, quadrangular or of any other shape. In this cavity may rotate a plurality of pistons, say four, formed of two pairs or sets of diametrically opposed pistons $a'$, and $a^2$ and $b'$, $b^2$ fixed to two disks $a$, $b$, respectively. The said cavity has no stationary or movable bottom, as is the case in this class of rotary engines. The wall of the said cavity has ports $c$, $c'$ communicating respectively with the suction chamber C for feeding carbureted air and the exhaust chamber C' for the outlet of spent gases. D represents a water jacket and $d$ is the firing plug or other equivalent element.

In order that the cycle may be clearly understood, it is to be considered that the disks $a$, $b$, carrying the pistons $a'$, $a^2$ and $b'$ $b^2$ respectively, both revolve in the same direction, but at variable speeds, in order that the pistons may be caused to periodically approach and recede from each other. Starting from the position indicated in Fig. 1, wherein the pistons divide the cylinder into two small spaces $A'$ $A^2$ and into two large spaces $A^3$ $A^4$, it will be seen that, in the space $A^2$ opposite the firing plug $d$, the gas which has just been compressed and been brought into contact with the said plug, is exploding and that consequently an active stroke is beginning. The piston $a^2$ then revolves at a higher speed than the piston $b^2$; consequently the volume of the space $A^2$ increases at the same time as it is being displaced in the direction of the arrow, and becomes equal to the volume of the space $A^4$ when once the two pistons $a^2$ and $b^2$ have completed their active stroke. At this moment, the piston $b^2$ occupies the place of $a^2$ and the piston $a^2$ occupies the place of $b'$ and the exhaust stroke begins, because the port $c'$ which communicates with the exhaust chamber C' is uncovered. The pistons continue together to revolve, but from this position onward, the first piston $a^2$ moves at a lower speed than the piston $b^2$, thus causing the space $A^4$ to become smaller and smaller. During this time, the exhaust takes place through $c'$ until the space between the two pistons is reduced to the amount of the space A′, at which time the piston $a^2$ will occupy the place of $a'$ and the piston $b^2$ will occupy that of $b'$, that is to say the two pistons will have traveled exactly one half the circumference. From this point onward, at which the exhaust has been completed and the suction is beginning, both pistons again start to recede from each other, while at the same time continuing to revolve together, whereby the space A′ is made to increase in volume until it registers with the suction chamber C and a fresh charge will be drawn. When the space between the pistons is equal to $A^3$, the compression stroke begins; while then approaching each other, the second piston $a^2$ moves forward more rapidly than the one which precedes it ($b^2$) and the charge is compressed until it equals the space $A^2$; whereupon it is acted upon by the plug $d$ and fired. A fresh active stroke therefore begins to take place and the described cycle is repeated. In the drawing, the ports $c$, $c'$ of the chambers C and C′ are assumed to be so positioned as to produce an early exhaust and a retarded inlet.

It is to be observed that as the positions of the pistons $a'$, $a^2$ and $b'$ $b^2$ are symmetrical, the length of the latter should be so calculated that when the pistons $b^2$ and $a^2$ occupy the positions of $a^2$ and $b'$ respectively, leaving the space $A^4$ between them, the space $A^3$ left between the pistons $a'$ and $b^2$ remains reduced to the same space $A^2$ that existed before between the pistons $a^2$ and $b^2$. Consequently, at each complete revolution of the disks $a$, $b$, the four spaces existing between the pistons again perform exactly the same cycle, so that four active strokes will be produced for every revolution. By this arrangement, the Otto cycle is obtained without the necessity of any distributing device, simply by utilizing two ports which are uncovered as the pistons revolve. Another peculiarity of this arrangement resides in that the explosion always takes place at the same point and by the travel of the explosive mixture, so that the use of magneto-electric device for firing the charge may be dispensed with and the plug be replaced by some suitable incandescent body, the incandescence of which would be kept up by the very heat of the explosion. The kinematical condition for enabling such a distribution system to be effected is that, for every revolution made by both the disks $a$, $b$, the pistons shall approach and recede twice, the position at which they are closest together always coinciding with the same point. There are numerous kinematical arrangements for producing such a motion, many of which are capable of being applied to the engine herein described. The following discloses an arrangement of gearing elements which satisfies the conditions above referred to; it is shown in section at Fig. 2 and diagrammatically in Figs. 3, 4 and 5. In these latter three figures the gear is shown in three different positions corresponding to the smallest, the mean and largest distance apart between two consecutive pistons.

The engine shaft M has keyed on it two arms $e$ $e'$, on the ends of which are fitted crank shafts $e^2$ $e^3$ carrying toothed wheels $f$, $f'$ gearing with stationary gears $g$ $g'$, the diameter of the latter being double that of the wheels $f$, $f'$. It follows that, for every revolution of the engine shaft M, the satellites $f$ $f'$ make two revolutions. On these crank shafts $e^2$, $e^3$ are fitted at say 90° from each other, rods $h$ $h'$ which are jointed to the ends of arms $j$, $j'$ fixed to or integral with disks $a$, $b$. The disks $a$, $b$ being loose on the shaft M, it follows that as the satellites $f$, $f'$ revolve, the rods $h$, $h'$ cause the arms $j$, $j'$ to approach and recede from each other twice for every complete revolution of the said shaft, thus satisfying the conditions necessary for the operation of the engine. The lengths of the rods $h$, $h'$ and their pivotal points are naturally so devised that the arms $j$, $j'$ shall travel the necessary angular distances in their positions of largest and smallest distance apart.

In practice, the modified arrangement shown in Figs. 6 and 7 may also be adopted. According to this modification, the entire mechanism which causes the to and fro movement of the pistons with reference to each other is situated on one side of the engine. To that end, both disks $a$, $b$ are provided with concentric hubs $k$, $l$ carrying the arms $j$, $j'$ actuated by the rods $h$, $h'$ which, in turn, are mounted on small crank shafts $m$ connected at their extremity to the epicycloidal gear hereinbefore described. The frame N which carries the satellites $f$, $f'$ is fast with the engine shaft M. In this modification, the ports $c$, $c'$ of the chambers C, C′ may be arranged laterally, in order to facilitate fitting the engine together. The gear $g$ which in the previous construction is assumed to be fast on the casing of the engine, is adjustable and may be brought into different positions by means of a worm $n$ gearing in a worm-wheel $n'$ thus enabling the closest distance apart of the pistons to be varied and consequently allowing an earlier firing and an earlier exhaust to be produced.

It will be readily understood that the essential portion of the invention would still subsist if the pistons, instead of being held radially by two disks, were fastened sidewise to two drums. The number of the pistons might also be increased by fixing for instance, to each disk, four pistons instead of two; in such a case, the cycle would be produced in half a revolution instead of in a complete revolution, with an arrangement similar to that described. The piston chamber might also, instead of assuming the shape of a torus, be of any section and, again, the epicycloidal gear, instead of comprising the two satellites per set, might have three, four or more arranged star-fashion. Any other system of kinematical gear producing the same result might even replace the one hereinbefore described.

We claim:

1. A rotary engine comprising a casing, a central shaft, an annular cylinder, two pairs of coöperating pistons in said cylinder, a pair of disks mounted loosely on said shaft and arranged symmetrically to the right and left of the plane, dividing the cylinder into two parts, each disk carrying a pair of pistons, a gear wheel fixed to said casing, satellite gears connected to said disks and engaging said gear-wheel, and means for angularly adjusting said gear-wheel relative to the central shaft for the purpose set forth.

2. A rotary engine comprising a casing, a central shaft revolubly mounted in said casing, an annular cylinder, a pair of disks mounted loosely on said shaft, a pair of pistons carried by each of said disks and operable in the cylinder, a gear wheel mounted adjustably on said casing, an arm connected to each of said disks, a frame fixed to the central shaft, crank shafts journaled on said frame, a pinion fixed on each of said crank shafts and engaging with the gear wheel on the casing and having half as many teeth as said wheel, rods connecting said crank shafts and said disk arms, a worm wheel fixed to the gear wheel, and a worm engaging said worm wheel.

3. A rotary engine comprising a casing (A), a central shaft (M) revolubly mounted in said casing, an annular cylinder, two pairs of coöperating pistons ($a'$, $a^2$, $b'$, $b^2$) in said cylinder, a pair of disks ($a$, $b$) mounted loosely on said shaft, concentric hubs ($k$, $l$,) formed on said disks and projecting to one side of the center of the cylinder, arms ($j$, $j'$) attached to said hubs, a frame (N) fast to the engine shaft (M), crankshafts ($m$) mounted in said frame, satellite gears ($f$) mounted on said shafts, a gear ($g$) mounted on the casing and engaging said satellite gears, and rods ($h$, $h'$) connecting said crankshafts to said arms ($j$, $j'$).

ANTONIO SANCHEZ.
CLAUDIO BARADAT.

Witnesses:
R. H. BRANDON,
LOUIS RINUY.